(12) United States Patent
Kang

(10) Patent No.: US 10,410,618 B2
(45) Date of Patent: Sep. 10, 2019

(54) IN-VEHICLE NOISE CONTROL SYSTEM AND CONTROL METHOD THEREOF

(71) Applicants: Hyundai Motor Company, Seoul (KR); Kia Motors Corporation, Seoul (KR)

(72) Inventor: Seong Kue Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/867,132

(22) Filed: Jan. 10, 2018

(65) Prior Publication Data

US 2018/0261200 A1  Sep. 13, 2018

(30) Foreign Application Priority Data

Mar. 10, 2017 (KR) .................. 10-2017-0030482

(51) Int. Cl.
*G10L 21/0208* (2013.01)
*G10K 11/178* (2006.01)
*G01C 21/36* (2006.01)

(52) U.S. Cl.
CPC ...... *G10K 11/178* (2013.01); *G10K 11/17825* (2018.01); *G10K 11/17875* (2018.01); *G10K 11/17885* (2018.01); *G10L 21/0208* (2013.01); *G01C 21/3661* (2013.01); *G10K 2210/1282* (2013.01); *H04R 2499/13* (2013.01)

(58) Field of Classification Search
CPC ........... G10K 11/178; G10K 11/17825; G10K 11/17875; G10K 11/17885; G10K 2210/1282; G01C 21/3661; G10L 21/0208; H04R 2499/13
USPC .............. 381/86, 71.4, 71.8, 71.13, 94.1
See application file for complete search history.

(56) References Cited

U.S. PATENT DOCUMENTS 8,355,512 B2   1/2013  Pan et al.
2006/0262935 A1*  11/2006  Goose .................... H04S 3/002
                                                     381/17

(Continued)

FOREIGN PATENT DOCUMENTS

JP   2008-184129 A   8/2008
JP   2009-281264 A  12/2009

(Continued)

*Primary Examiner* — Vivian C Chin
*Assistant Examiner* — Con P Tran
(74) *Attorney, Agent, or Firm* — Mintz Levin Cohn Ferris Glovsky and Popeo, P.C.; Peter F. Corless

(57) ABSTRACT

An in-vehicle noise control system is provided. The system includes speakers that output navigation guidance sound and audio content reproduced at a head unit of a vehicle. An audio module receives the navigation guidance sound and an audio content signal to generate an opposite waveform with respect to the navigation guidance sound and output noise offset waveforms in which tuning functions are calculated based on positions of the speakers to the opposite waveform. An amplifier is connected between the audio module and the speakers. The audio module outputs the navigation guidance sound and the audio content signal to one of the speakers located at a driver's seat and outputs the noise offset waveforms and the audio content signal to the remaining speakers.

23 Claims, 3 Drawing Sheets

(56) References Cited

U.S. PATENT DOCUMENTS

| | | | | |
|---|---|---|---|---|
| 2010/0124337 A1* | 5/2010 | Wertz | ............ | G10K 11/178 381/71.11 |
| 2012/0321099 A1* | 12/2012 | Eichfeld | ............ | H04S 7/302 381/86 |
| 2016/0080885 A1* | 3/2016 | Hampiholi | ............ | G06F 3/165 381/302 |
| 2016/0142852 A1* | 5/2016 | Christoph | ............ | H04S 7/303 381/302 |
| 2016/0284337 A1 | 9/2016 | Inoue | | |
| 2017/0213541 A1* | 7/2017 | MacNeille | ............ | H04R 1/1083 |

FOREIGN PATENT DOCUMENTS

| | | |
|---|---|---|
| JP | 2010-228641 A | 10/2010 |
| JP | 2011-152820 A | 8/2011 |
| KR | 10-2013-0004714 | 1/2013 |
| KR | 10-1557228 | 10/2015 |

\* cited by examiner

RELATED ART

IN-VEHICLE NOISE CONTROL SYSTEM AND CONTROL METHOD THEREOF

CROSS-REFERENCE TO RELATED APPLICATION

This application claims priority to and the benefit of Korean Patent Application No. 10-2017-0030482, filed on Mar. 10, 2017, the disclosure of which is incorporated herein by reference in its entirety.

BACKGROUND

1. Field of the Invention

The present invention relates to a vehicle, and more particularly, to an in-vehicle noise control system for listening to audio content of a passenger in a vehicle and a control method thereof.

2. Discussion of Related Art

A desire to enjoy high quality sound in a vehicle has steadily increased. However, various unnecessary noises are generated even when it is desired to listen to audio content in a vehicle. For example, driving noise caused by friction with a road surface or air while driving the vehicle, inevitable noise such as external warning sound, e.g., horn sound or the like, and guide sound reproduced for driver convenience, such as navigation sound and camera warning sound act as noise when listening to audio content. When listening to audio content in a vehicle, such noises reduce satisfaction and increase fatigue. Particularly, for a passenger (in a passenger seat or a back seat), the navigation sound is more disturbing when listening to audio content.

Generally, to improve an audio listening environment, methods such as lossless audio codec support and high power speaker installation have been used. However, since an internal space of the vehicle is recognized as one general space, it is not suitable as a noise control method for passengers. Therefore, a beamforming technique of a speaker and a microphone is applied as a technique for processing audio content while the internal space of the vehicle is separated into compartments. However, the above-described problem is not fundamentally solved.

SUMMARY

The present invention is directed to an in-vehicle noise control system which enhances an audio listening environment of a passenger to allow the passenger to listen to audio contents reproduced in a vehicle without noise and a control method thereof.

According to an aspect of the present invention, an in-vehicle noise control system may include a plurality of speakers configured to output navigation guidance sound and audio content reproduced at a head unit and installed inside a vehicle; an audio module configured to receive the navigation guidance sound and an audio content signal, to generate an opposite waveform with respect to the navigation guidance sound and to output noise offset waveforms in which tuning functions are calculated based on positions of the plurality of speakers to the opposite waveform; and an amplifier connected between the audio module and the speakers, wherein the audio module is configured to output the navigation guidance sound and the audio content signal to one of the speakers located at a driver's seat and output the noise offset waveforms and the audio content signal to the remaining speakers.

The audio module may include an audio content receiver configured to receive the audio content signal from the head unit; a noise detector configured to detect the navigation guidance sound and in-vehicle noise; and a noise controller configured to generate an opposite waveform with respect to a noise signal detected by the noise detector and to output the noise offset waveforms in which the tuning functions are calculated based on the positions of the plurality of speakers to the opposite waveform. The audio module may include DIRANA.

The system may further include a microphone configured to detect and transmit the in-vehicle noise to the audio module. The microphone may be installed at the driver's seat within the vehicle. The plurality of speakers may include a first speaker installed at the driver's seat; a second speaker installed at a passenger seat; and a third speaker and a fourth speaker installed at left and right sides of a back seat. Each of the plurality of speakers may include an earphone.

The amplifier and the plurality of speakers may be separately connected via channels different from each other. The tuning functions may have different values based on positions of the first speaker, the second speaker, the third speaker and the fourth speaker. The turning functions may be determined based on an internal temperature of the vehicle and a distance between the first speaker and each of the remaining speakers. The noise offset waveforms may be formed by a product of the opposite waveform and the tuning functions. The audio module may be operated by a user input using an operation button. The audio module may be configured to perform noise control when an earphone jack is inserted into the speaker at which a passenger is located and may not perform the noise control when the earphone jack is removed.

According to another aspect of the present invention, an in-vehicle noise control system may include an audio player configured to reproduce navigation guidance sound and audio content; a plurality of speakers installed within a vehicle and configured to output each of the navigation guidance sound and the audio content reproduced by the audio player; an audio content receiver configured to receive an audio content signal from the audio player; a noise detector configured to detect the navigation guidance sound and in-vehicle noise; and a noise controller configured to generate an opposite waveform with respect to a noise signal detected by the noise detector and to output noise offset waveforms in which tuning functions are calculated based on positions of the plurality of speakers to the opposite waveform. The noise controller may be configured to output the navigation guidance sound and the audio content signal to one of the speakers which is located at a driver's seat through an amplifier and output the noise offset waveforms and the audio content signal to the remaining speakers through the amplifier.

The noise offset waveforms may be formed by a product of the opposite waveform and the tuning functions. The turning functions may be determined based on an internal temperature of the vehicle and a distance between the speaker located at the driver's seat and each of the remaining speakers. The system may further include a microphone configured to detect and transmit the in-vehicle noise to the noise detector. The microphone may be installed at the driver's seat within the vehicle. The noise controller may be configured to perform noise control when an earphone jack is inserted into the speaker at which a passenger is located and may not perform the noise control when the earphone jack is removed.

According to still another aspect of the present invention, an in-vehicle noise control method may include reproducing navigation guidance sound and audio content at an audio player; receiving the navigation guidance sound and an audio content signal from an audio module and generating an opposite waveform with respect to the navigation guidance sound; outputting the opposite waveform and noise offset waveforms in which tuning functions are calculated based on positions of a plurality of speakers inside a vehicle; and a noise control operation of outputting the navigation guidance sound and the audio content signal to one of the speakers which is located at a driver's seat and outputting the noise offset waveforms and the audio content signal to the remaining speakers.

The method may further include detecting in-vehicle noise with a microphone installed within the vehicle and transmitting the detected noise to the audio module after the noise control operation. The noise offset waveforms may be formed by a product of the opposite waveform and the tuning functions. The turning functions may be determined based on an internal temperature of the vehicle and a distance between the speaker located at the driver's seat and each of the remaining speakers. The noise control operation may perform noise control when an earphone jack is inserted into the speaker at which a passenger is located and may not perform the noise control when the earphone jack is removed.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
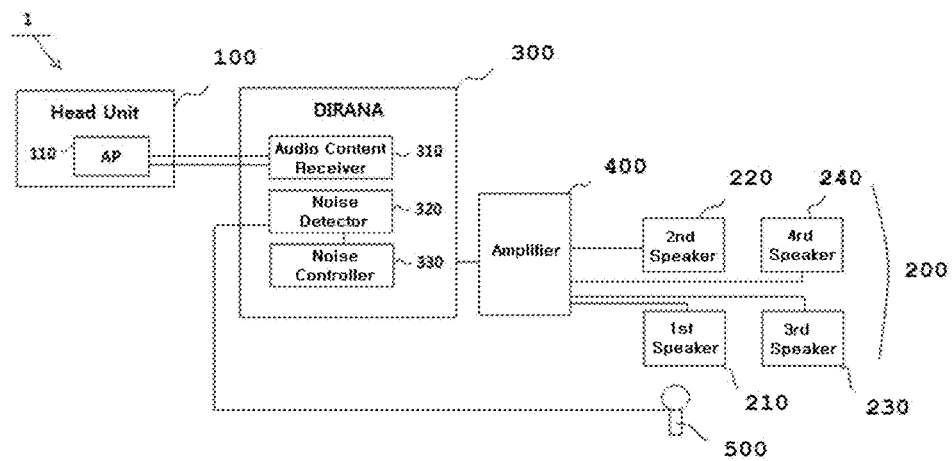
FIG. 1 is a block diagram of an in-vehicle noise control system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described in detail below with reference to the accompanying drawings. In the drawings, some constitution components are exaggerated, omitted or schematically shown for convenience and clarity of explanation. Further, the size of respective components does not reflect entirely the actual size. Also, like reference numerals refer to like or corresponding elements throughout the drawings.

Figure 2:
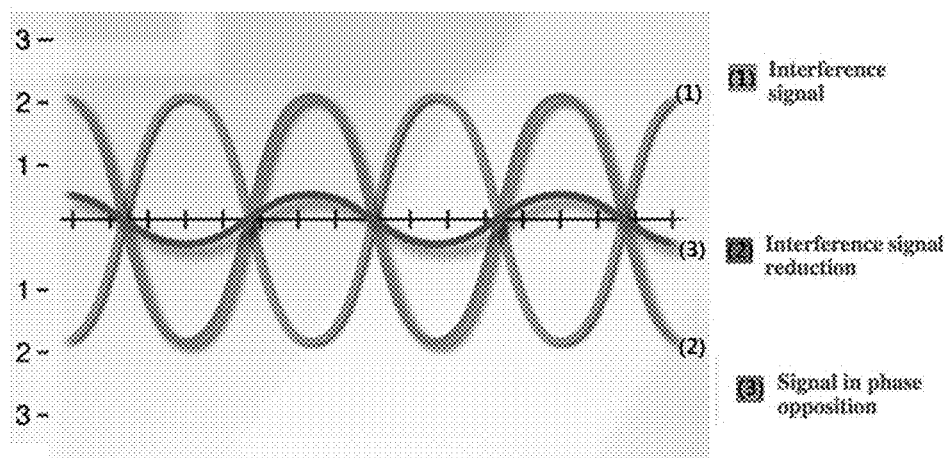
FIG. 2 is a view illustrating a noise control (noise cancelling) principle according to an exemplary embodiment of the present invention.
Figure 3:
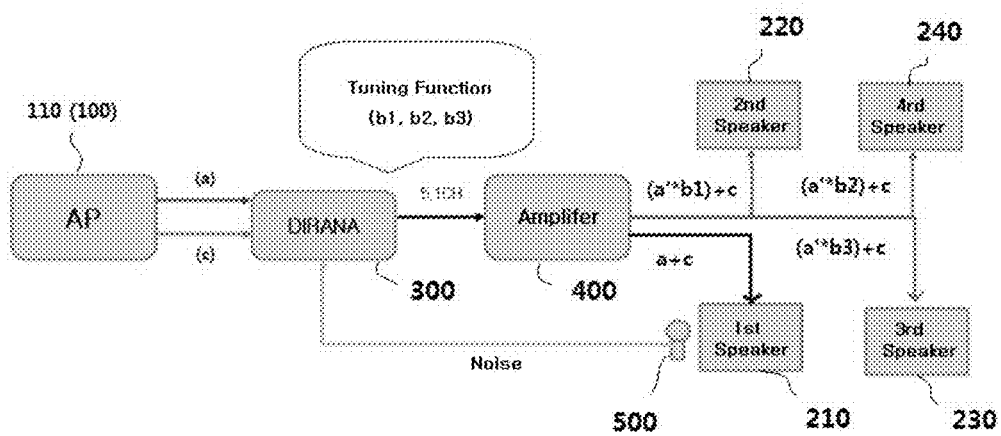
FIG. 3 is a view illustrating an operation of the in-vehicle noise control system according to the exemplary embodiment of the present invention.
Figure 4:
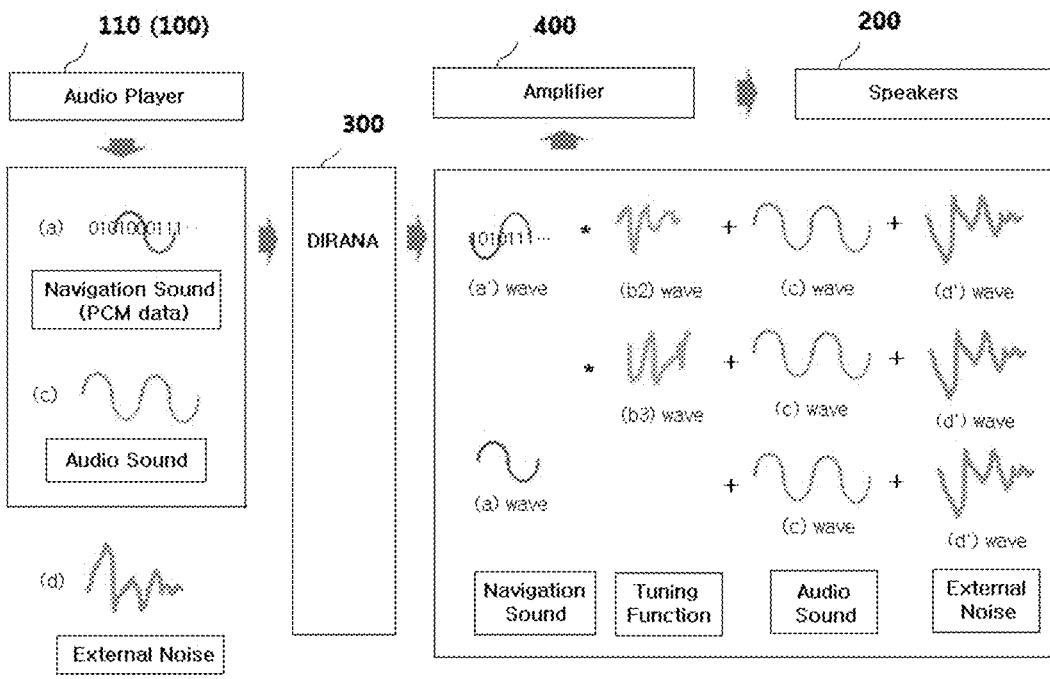
FIG. 4 is a view illustrating a channel configuration transferred between interfaces of FIG. 3 according to an exemplary embodiment of the present invention.
Figure 5:
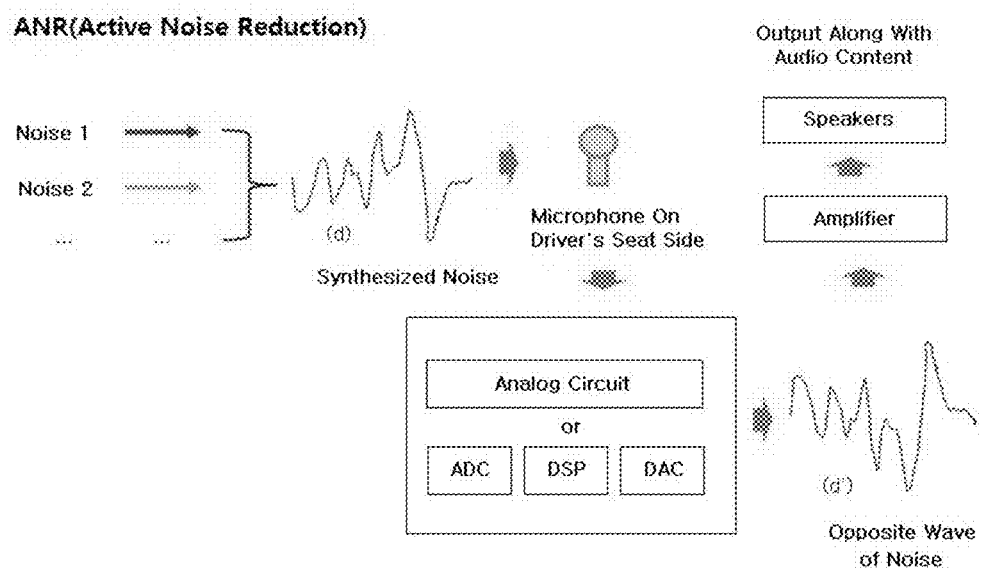
FIG. 5 is a view illustrating a general principle of an active noise reduction (ANR) technique according to the related art.

FIG. 1 is a block diagram of an in-vehicle noise control system according to an exemplary embodiment of the present invention, FIG. 2 is a view illustrating a noise control (noise cancelling) principle applied to the present invention, FIG. 3 is a view illustrating an operation of the in-vehicle noise control system according to the embodiment of the present invention, FIG. 4 is a view illustrating a channel configuration transferred between interfaces of FIG. 3, and FIG. 5 is a view illustrating a general principle of an active noise reduction (ANR) technique according to the related art.

Generally, a head unit 100 (e.g., an audio, video and navigation (AVN)) which integrally uses audio, video and navigation is mounted within a vehicle. As illustrated in FIG. 1, the head unit 100 may include an audio player (AP) 110 configured to output audio (e.g., sound source and voice). In description of the exemplary embodiment, more specifically, the head unit 100 may be the audio player 110, and the navigation may be a function included in the head unit 100 or may be a navigation device which is provided separately from the head unit 100.

In the exemplary embodiment, an in-vehicle noise control system may include the audio player 110, a plurality of speakers 200, an audio module 300 and an amplifier 400. The audio player 110 may be configured to reproduce guide sound of the navigation and an audio content of MP3, radio or the like. A driver may listen to a voice guidance message of the navigation through the audio player 110 of the head unit 100 and may also reproduce and listen to the audio content of the MP3, the radio or the like together with a passenger.

The plurality of speakers 200 may be installed within the vehicle and may be configured to output the audio content and the guide sound of the navigation which are reproduced in the audio player 110. The number of speakers 200 may be variously selected based on a type and a shape of the vehicle. For example, the speakers 200 may be a first speaker 210 installed at a driver's seat, a second speaker 220 installed at a passenger seat and third and fourth speakers 230 and 240 installed at left and right back seats, but the present invention is not limited thereto. Particularly, each of the speakers 200 is a superordinate concept to a device for outputting sound, music and the like and is used as a term including an earphone. Therefore, the plurality of speakers 200 may be referred to as earphones and may include earphone jacks. The audio module 300 may be configured to remove noise in the vehicle to allow a passenger to listen to only an audio content without listening to unnecessary navigation guidance sound when listening to the audio content. The navigation guidance sound is required for the driver's seat, but may be noise for the passenger's seat. Thus, in the embodiment, noise is used as a term including such unnecessary navigation sound.

Referring to FIG. 2, a noise removing (noise cancelling) principle basically uses an active noise reduction (ANR) method in which an interference signal is reduced by outputting a signal in phase opposition thereto. For reference, in a general ANR method, as illustrated in FIG. 5 according to the related art, noises are received from a microphone located at a driver's seat side, and sound waves opposite to the noise are generated using an analog circuit or by digital-processing performed with a combination of ADC/DSP/DAC and then output to an external amplifier 400, and thus the noises are offset.

However, in the exemplary embodiment, the noises are not received from the microphone, and a waveform of the navigation guidance sound may be directly obtained from the audio module 300, and noise control may be performed. The audio module 300 may include (DIRANA) to effectively perform the noise control. The DIRANA (brand name) is a single chip and may perform complex noise control processing such as that a volume of an internal signal component is offset using digital signal processing (DSP). In the drawing of the exemplary embodiment, a portion referred to as DIRANA is the audio module 300.

The audio module 300 may be configured to directly receive signal waveforms of the navigation guidance sound and the audio content and generate a waveform opposite to the navigation guidance sound. Referring to FIG. 3, assuming that a waveform of the navigation guidance sound is a, an opposite waveform in phase opposition may be a'. When the opposite waveform a' is generated, the navigation guidance sound is generated only around the driver, and a specific tuning function should be multiplied in consideration of reflection and offset. The tuning function may be changed according to a space organization in the vehicle, and thus a tuning function value may be designed in advance.

For example, the tuning functions may have different values based on a position of each of the first speaker 210, the second speaker 220, the third speaker 230 and the fourth speaker 240. And the tuning functions may be determined according to an internal temperature of the vehicle and a distance between the first speaker 210 and each of other speakers 200. Therefore, the tuning functions of the second speaker 220 to the fourth speaker 240 with respect to the first speaker 210 as a reference value may be b1, b2 and b3. Therefore, the audio module 300 may be configured to output noise offset waveforms in which each of the tuning functions b1, b2 and b3 is calculated based on the position of each of the plurality of speakers 200.

The noise offset waveforms may be formed by a product of the opposite waveform a' and the tuning functions b1, b2 and b3. In other words, the noise offset waveform of the second speaker 220 may be a'*b1, the noise offset waveform of the third speaker 230 may be a'*b2, and the noise offset waveform of the fourth speaker 230 may be a'*b3. When the noise offset waveforms are formed, the noise offset waveforms and the audio content may be mixed and output from the speakers except the speaker located at the driver's seat. That is, a+c which is a combination of the navigation guidance sound and the audio content may be output to the first speaker 210 located at the driver's seat, the combination of the noise offset waveform and the audio content which is (a'*b1)+c may be output to the second speaker 220, the combination of the noise offset waveform and the audio content which is (a'*b2)+c may be output to the third speaker 230, and the combination of the noise offset waveform and the audio content which is (a'*b3)+c may be output to the fourth speaker 240.

As described above, the exemplary embodiment includes a speaker control logic and an audio mixing rule which are differentiated according to the position of the speaker. To perform the above-described function, as illustrated in FIG. 1, the audio module 300 may include an audio content receiver 310, a noise detector 320 and a noise controller 330.

The audio content receiver 310 may be configured to receive an audio content signal from the head unit (the audio player 110). The audio content signal may be navigation guidance sound, music of the MP3, sound of the radio or the like. The noise detector 320 may then be configured to detect the navigation guidance sound and in-vehicle noise. When the passenger intends to listen to the audio content, the noise detector 320 may be configured to detect and recognize the navigation guidance sound as noise. The noise detector 320 may not detect the navigation guidance sound as the noise to the driver.

The noise controller 330 may be configured to generate the opposite waveform with respect to a noise signal (e.g., the navigation guidance sound) detected from the noise detector 320 and output the noise offset waveforms in which the tuning functions are calculated based on the positions of the plurality of speakers 200 to the opposite waveform. Although not shown in the drawing, the audio module 300 may further include a mixer. The mixer may combine the sound source waveform input to the sound source receiving unit 310 and the waveform generated by the sound sensing unit 320 and the noise controller 330 and send the combined sound source waveform to the amplifier 400.

Accordingly, the audio module 300 may mix the navigation guidance sound and the audio sound source, and then transmit the audio sound source to the first speaker 210 through the amplifier 400. The audio module 300 may transmit only the audio sound source to the second speaker 220 via the amplifier 400. The audio module 300 may transmit an audio source and a navigation offset canceling sound to the third speaker 230 and the fourth speaker 240 via the amplifier 400.

The amplifier 400 may be connected between the audio module 300 and the speakers 200. The amplifier 400 may be configured to amplify and output signals output from the audio module 300 to the speakers 200.

In particular, the plurality of speakers 200 may have different sound transmission times or the like based on the positions thereof and thus, may be connected separately to the amplifier 400 via channels different from each other. Therefore, the speakers 200 may be configured to output signals including the noise offset waveforms different from each other through channel shifting.

As described above, the audio module 300 may be configured to output the navigation guidance sound and the audio content signal to the speaker 210 located at the driver's seat among the speakers 200 and may be configured to output the noise offset waveforms and the audio content signal to the remaining speakers 220, 230 and 240. Additionally, the noise offset waveform offsets the navigation guidance sound output from the speaker 210 located at the driver's seat, and thus the speakers 220, 230 and 240 at which the passenger is located may be configured to output only the audio content.

In particular, the audio module 300 may be selectively operated based on a user input. The user input may be permitted only under specific situations, e.g., when the earphone jack is inserted into the speaker at which the passenger is located or when a noise removing button is pushed or otherwise engaged. For example, when the earphone jack is inserted into the speaker at which the passenger is located, the noise control may be performed, and when the earphone jack is removed, the noise control may not be performed. When necessary, the position of the passenger may be adjusted to prevent the navigation guidance sound from being heard.

As described above, the in-vehicle noise control system of the exemplary embodiment provides an effect in which the sound may be output in a state in which the mixing rule is changed according to situations in consideration of a position difference of the driver and the passenger even in the same vehicle space or compartment.

Referring to FIG. 4, a viewpoint and a principle of the technology will be described in more detail. Since a waveform of the navigation original sound reproduced by the audio player 110 is to generate pulse code modulation (PCM) data, the waveform may be digitized and obtained as it is in advance before being output. The external noise and the audio content (e.g., the navigation guidance sound, the warning sound or the like) generated from the audio player 110 in the vehicle are different from each other in properties thereof and thus may be distinguished and removed.

Therefore, the noise control system of the exemplary embodiment increases a processing speed and accuracy when generating the opposite waveform for noise cancellation. In addition, it may be possible to directly receive a signal waveform from the audio player 110 without the analog-to-digital converter (ADC) process, the digital signal processing (DSP) process and the digital-to-analog converter (DAC) process in the general active noise reduction (ANR) method illustrated in FIG. 5 and then to perform the noise control by applying a digital signal processing technique or the like. Accordingly, the present invention may be referred to as a Pre-ANR technique which may be used more rapidly than the ANR technique.

Meanwhile, the in-vehicle noise control system of the exemplary embodiment may use the Pre-ANR technique along with the ANR technique which is generally used. In other words, the exemplary embodiment may further include a microphone 500 configured to detect and transmit the in-vehicle noise to the audio module 300. In particular, the microphone 500 may be configured to detect and transmit other internal noises such as driving noise and external horn sound generated from the vehicle to the noise detector 320 of the audio module 300, and the noise controller 330 may be configured to perform the noise control in the ANR method. The microphone 500 may be installed at the driver's seat within the vehicle and, when necessary, may be installed at various other locations within the vehicle.

As described above, since the exemplary embodiment of the present invention may remove the navigation guidance sound using the Pre-ANR technique and also may remove other unnecessary internal noises for listening to the audio content, such as the driving noise using the above-described ANR technique, the audio listening environment may be further improved.

Hereinafter, a noise control method through the in-vehicle noise control system of the present invention will be described. First, an operation of reproducing the navigation guidance sound and the audio content through the audio player 110 may be performed. This is the case in which the driver reproduces the navigation guidance sound and the audio content at the same time. Next, an operation of receiving the navigation guidance sound and the audio content from the audio player 110 and generating the opposite waveform with respect to the navigation guidance sound is performed. As described above, the opposite waveform has a phase opposite to that of the navigation guidance sound.

Then, an operation of outputting the noise offset waveforms in which the tuning functions are calculated based on the positions of the plurality of speakers 200 within the vehicle is performed. The audio module 300 may be configured to output the noise offset waveforms in which the tuning functions b1, b2 and b3 are calculated based on the positions of the plurality of speakers 200 to the opposite waveform a'. The noise offset waveforms may be formed by the product of the opposite waveform a' and the tuning functions b1, b2 and b3. Therefore, the noise offset waveform of the second speaker 220 may be a'*b1, the noise offset waveform of the third speaker 230 may be a'*b2, and the noise offset waveform of the fourth speaker 230 may be a'*b3.

Further, a noise control operation in which the navigation guidance sound and the audio content signal are output to the speaker 210 located at the driver's seat among the speakers 200 and the noise offset waveforms and the audio content signal are output to the remaining speakers 220, 230 and 240 is performed. In the operation, a+c which is the navigation guidance sound and the audio content may be output to the first speaker 210, the noise offset waveform and the audio content which are (a'*b1)+c may be output to the second speaker 220, the noise offset waveform and the audio content which are (a'*b2)+c may be output to the third speaker 230, and the noise offset waveform and the audio content which are (a'*b3)+c may be output to the fourth speaker 240.

The Pre-ANR technique may be applied up to the above-described operations. In particular, the control of the audio module 300 may be performed automatically or in response to receiving a user input. The user input may be permitted under particular situations, e.g., when the earphone jack is inserted into the speaker at which the passenger is located or when the noise removing button is pushed or otherwise engaged. Even when there is no user input, the navigation guidance sound may be prevented from being heard at the seat at which the passenger is located. After the noise control operation, an operation of detecting the in-vehicle noise with the microphone 500 installed inside the vehicle and transmitting the detected noise to the audio module 300 is performed. The ANR technique may be applied from the operation, and the above-described process will be omitted.

Since the in-vehicle noise control system and the control method thereof according to the present invention are operated in a method in which the noise cancelling, the speaker control logic, the audio mixing rule and so on may be changed according to the situations, it may be possible to listen to the audio content reproduced in the vehicle without an separate operation (automatically) or through a user operation (input) without the navigation noise, and thus, the audio listening environment of the passenger may be enhanced. Additionally, since the exemplary embodiment of the present invention may remove the navigation guidance sound using the Pre-ANR technique and also may remove other unnecessary internal noises for listening to the audio content, such as the driving noise using the above-described ANR technique, the audio listening environment may be further improved.

The characteristics, structures and effects described in the exemplary embodiments above are included in at least one exemplary embodiment but are not limited to one embodiment. Furthermore, the characteristic, structure, and effect illustrated in each embodiment may be combined or modified for other exemplary embodiments by a person skilled in the art. Thus, it would be construed that contents related to such a combination and such a variation are included in the scope of the present invention.

What is claimed is:

1. An in-vehicle noise control system, comprising:
a plurality of speakers configured to output navigation guidance sound and audio content into a vehicle;
an audio module configured to receive the navigation guidance sound and an audio content signal, to generate an opposite waveform with respect to the navigation guidance sound and to output noise offset waveforms in which tuning functions are calculated based on positions of the plurality of speakers to the opposite waveform; and
an amplifier connected between the audio module and the plurality of speakers,
wherein the audio module is configured to output the navigation guidance sound and the audio content signal to one of the plurality of speakers which is located at a driver's seat and output the noise offset waveforms and the audio content signal to the remaining speakers except the one of the plurality of speakers.

2. The system of claim 1, wherein the audio module includes:
an audio content receiver configured to receive the audio content signal;
a noise detector configured to detect the navigation guidance sound and in-vehicle noise; and
a noise controller configured to generate an opposite waveform with respect to a noise signal detected by the noise detector and to output the noise offset waveforms in which the tuning functions are calculated based on the positions of the plurality of speakers to the opposite waveform.

3. The system of claim 2, further comprising:
a microphone configured to detect and transmit the in-vehicle noise to the audio module.

4. The system of claim 3, wherein the microphone is installed at the driver's seat within the vehicle.

5. The system of claim 4, wherein the plurality of speakers include:
a first speaker installed at the driver's seat;
a second speaker installed at a passenger seat; and
a third speaker and a fourth speaker installed at left and right sides of a back seat.

6. The system of claim 5, wherein each of the plurality of speakers include an earphone.

7. The system of claim 6, wherein the amplifier and the plurality of speakers are separately connected via channels different from each other.

8. The system of claim 7, wherein the tuning functions have different values based on positions of the first speaker, the second speaker, the third speaker and the fourth speaker.

9. The system of claim 8, wherein the turning functions are determined based on an internal temperature of the vehicle and a distance between the first speaker and each of the remaining speakers of the plurality of speakers.

10. The system of claim 9, wherein the noise offset waveforms are formed by a product of the opposite waveform and the tuning functions.

11. The system of claim 10, wherein the audio module is controlled by a user operation of an operation button.

12. The system of claim 11, wherein the audio module is configured to perform noise control when an earphone jack is inserted into the remaining speakers except the first speaker of the plurality of speakers.

13. An in-vehicle noise control system, comprising:
an audio player configured to reproduce navigation guidance sound and audio content;
a plurality of speakers installed within a vehicle and configured to output each of the navigation guidance sound and the audio content reproduced by the audio player;
an audio content receiver configured to receive an audio content signal from the audio player;
a noise detector configured to detect the navigation guidance sound and in-vehicle noise; and
a noise controller configured to generate an opposite waveform with respect to a noise signal detected by the noise detector and to output noise offset waveforms in which tuning functions are calculated based on positions of the plurality of speakers to the opposite waveform,
wherein the noise controller is configured to output the navigation guidance sound and the audio content signal to one of the plurality of speakers which is located at a driver's seat through an amplifier and output the noise offset waveforms and the audio content signal to the remaining speakers except the one of the plurality of speakers through the amplifier.

14. The system of claim 13, wherein the noise offset waveforms are formed by a product of the opposite waveform and the tuning functions.

15. The system of claim 14, wherein the turning functions are determined based on an internal temperature of the vehicle and a distance between the speaker located at the driver's seat and each of the remaining speakers except the speaker located at the driver's seat.

16. The system of claim 15, further comprising:
a microphone which configured to detect and transmit the in-vehicle noise to the noise detector.

17. The system of claim 16, wherein the microphone is installed at the driver's seat inside the vehicle.

18. The system of claim 17, wherein the noise controller is configured to perform noise control when an earphone jack is inserted into the remaining speakers except the speaker located at the driver's seat.

19. An in-vehicle noise control method, comprising:
receiving, by a controller, reproduced navigation guidance sound and an audio content signal from an audio module and generating an opposite waveform with respect to the navigation guidance sound;
outputting, by the controller, the opposite waveform and noise offset waveforms in which tuning functions are calculated based on positions of a plurality of speakers within a vehicle; and
outputting, by the controller, the navigation guidance sound and the audio content signal as a noise control operation to one of the plurality of speakers which is located at a driver's seat and outputting the noise offset waveforms and the audio content signal to the remaining speakers except one of the speakers which is located at a driver's seat.

20. The method of claim 19, further comprising:
detecting, by the controller, in-vehicle noise with a microphone installed within the vehicle; and
transmitting, by the controller, the detected noise to the audio module after the noise control operation.

21. The method of claim 20, wherein the noise offset waveforms are formed by a product of the opposite waveform and the tuning functions.

22. The method of claim 21, wherein the turning functions are determined according to an internal temperature of the vehicle and a distance between the speaker located at the driver's seat and each of the remaining speakers except the speaker located at the driver's seat.

23. The method of claim 22, further comprising:
performing, by the controller, the noise control operation when an earphone jack is inserted into the speaker at which a passenger is located.

* * * * *